Oct. 9, 1951 R. P. ROWLSON 2,570,864
MIXING MACHINE
Filed July 23, 1948 2 Sheets-Sheet 1

INVENTOR.
Robert P. Rowlson

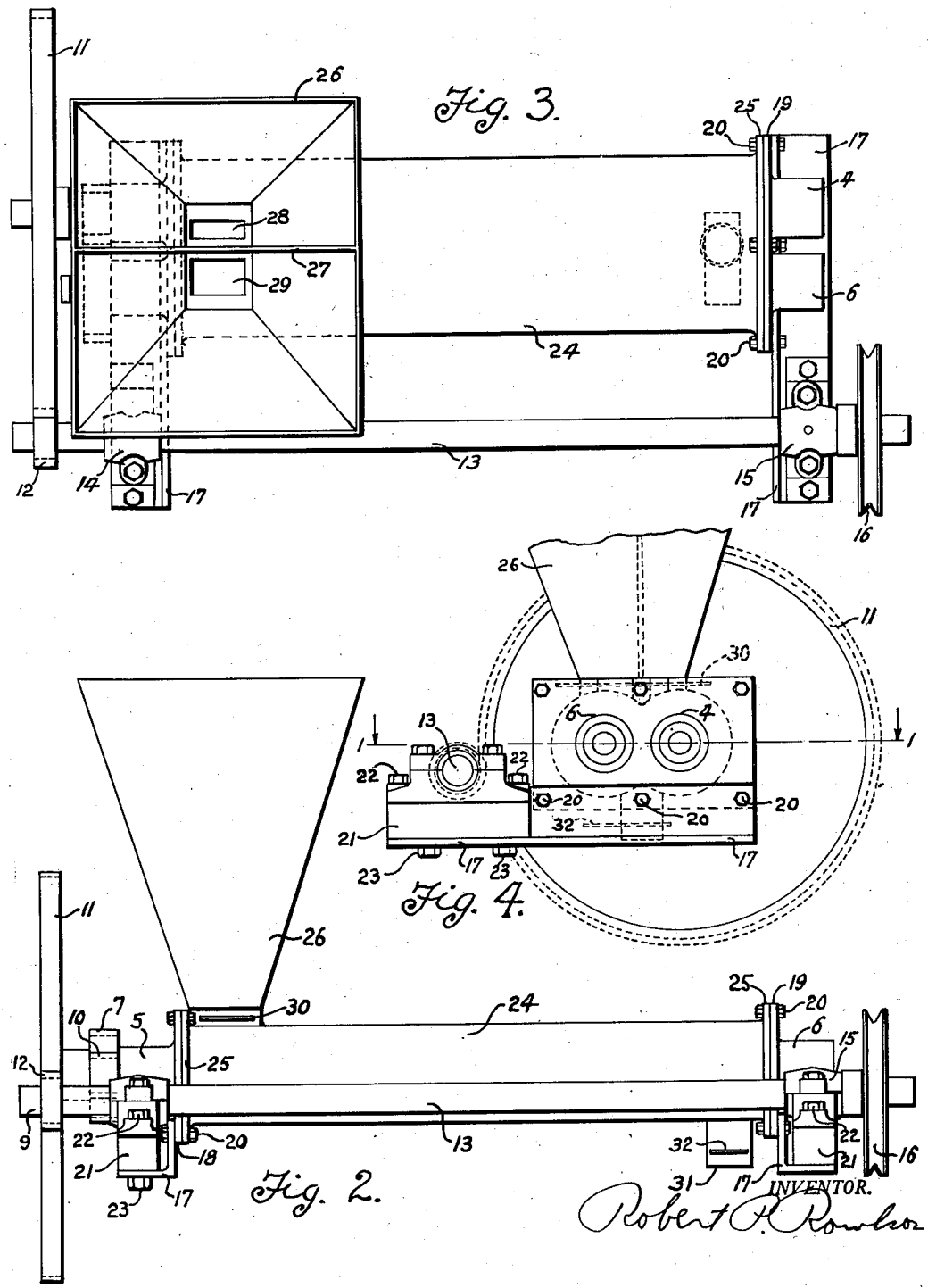

Patented Oct. 9, 1951

2,570,864

UNITED STATES PATENT OFFICE 2,570,864

MIXING MACHINE

Robert P. Rowlson, Detroit, Mich.

Application July 23, 1948, Serial No. 40,201

8 Claims. (Cl. 259—22)

This invention relates to improvements in machines for mixing, blending, disbursing and homogenizing substance, fluids or materials, or any combination thereof, in which two or more helical screws are placed contiguous to each other, each with a different pitch and speed. The screws are spaced in such relation to each other that the perimeter of one screw thread travels between the perimeter of another helical screw with the center distance between the screws being spaced in such manner that the outside diameter of one screw thread establishes and maintains a continuous overlap with sufficient adjustable clearance to enable the outside diameters to clear their bottom diameters by sufficient margin to leave clearance between the helical surfaces of the contiguously spaced helical screws. The screws in motion cause a rubbing, compressing, kneading, pulling, tearing, milling or plasticizing action upon the substance, fluids or materials, or any combination thereof sought to be mixed as it travels through the helical screws. It is because of the difference in pitch between the helices and the difference in surface speed of the helical screw surfaces revolving together in such a spaced manner and in relation to each other, that causes the complete mixing, blending, disbursing and homogenizing of the substance, fluid or materials or any combination thereof placed in the machine.

As is well known in the art to which this invention relates, mixing machines are more or less limited to mixing the particular types of materials they are designed for and do not function as well when used for mixing materials of other consistency; but in my invention, thorough and complete mixing, blending, disbursing and homogenizing is accomplished for any mixable substance, fluid or material. The scientific principle involved in the foregoing is workable, and I have proven its practicability by a model machine which I have constructed with two helical screws placed in parallel relation to each other, and I claim that the same principle is workable with the use of more than two helical screws placed in the same parallel or triangular relationship. In the model illustrated, one of the helical screws is a single thread revolving clockwise at twice the speed of the other, which is a double thread helical screw revolving counterclockwise.

The accompanying drawings illustrate the mechanical operation of my invention, which will become apparent from a study of the following specification read in connection with the drawings, in which:

Fig. 2 is an outside side elevation of the mixer.

Fig. 3 is an outside plan view of the mixer.

Fig. 4 is a partial end elevation of the mixer.

Similar numerals refer to similar parts throughout the several views.

Figure 1:
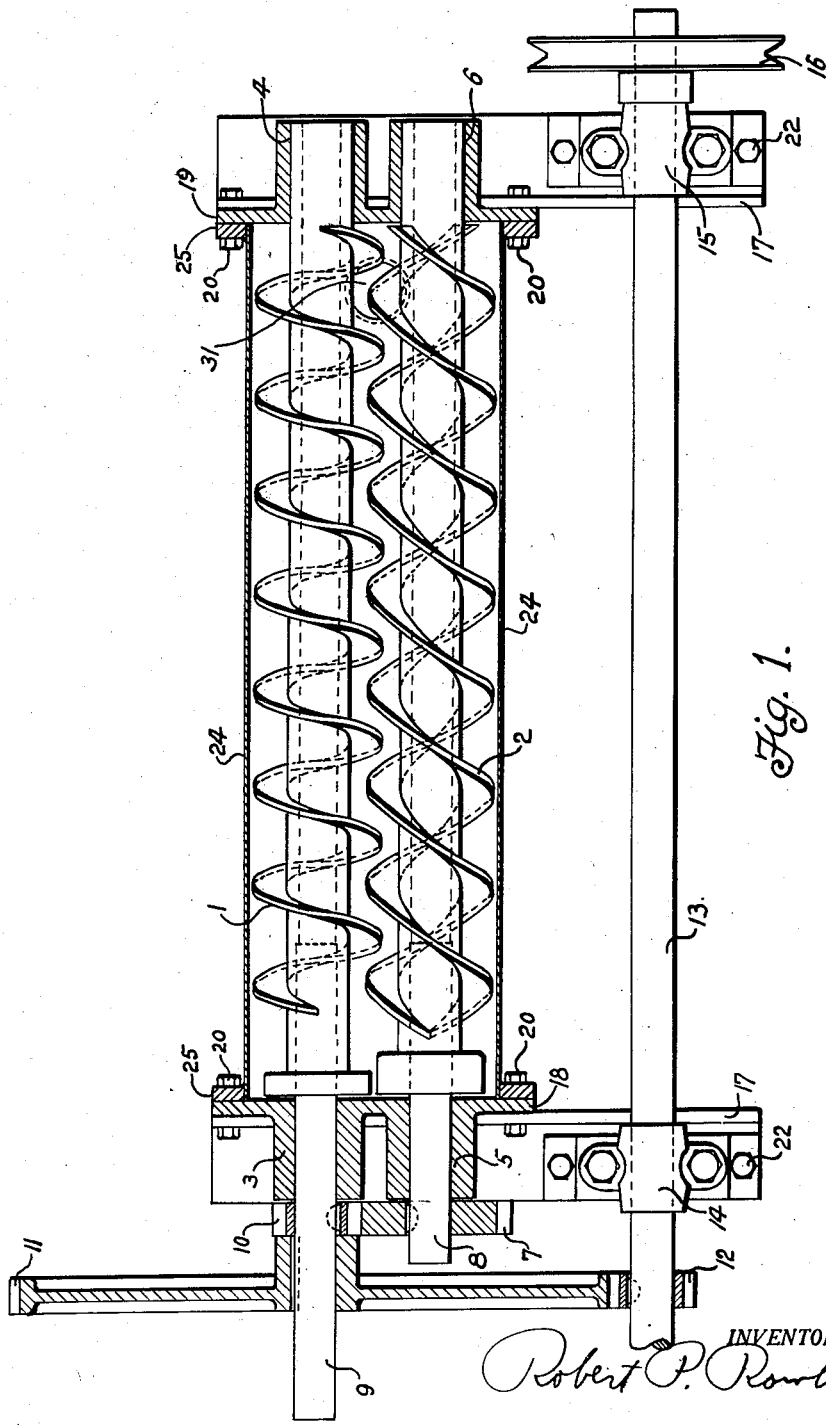
Fig. 1 is a horizontal longitudinal section on line 1—1 of Fig. 4.

Referring to the drawing, I have illustrated in Fig. 1 the preferred embodiment of my invention comprising a helical single thread screw 1 supported in bearings 3 and 4 and revolving in clockwise rotation at double the speed of another helical screw positioned in spaced parallel relation in bearings 5 and 6 with the helical double thread screw 2 being driven by a gear 7 keyed to shaft 8 of screw 2. On shaft 9 of screw 1 a gear 10 is keyed that meshes with the gear 7 on shaft 8 the ratio of gears 8 and 10 being 2 to 1 so that the screw 2 revolves at half the speed of screw 1. Screw 1 being driven by the large gear 11 keyed to shaft 9 which in turn is driven by gear 12 keyed to shaft 13 journaled in bearings 14 and 15 and on the other end of which is keyed a V-belt pulley 16 driven by a V-belt from the source of power not shown.

Bearings 14 and 15 are bolted by bolts 22 to spacer blocks 21 which in turn are mounted on angle iron supports 17 attached by bolts 20 to mixer housing end plates 18 and 19 held in place by bolts 23. Bearings 3 and 5 are integral with end plates 18 and bearings 4 and 6 are integral with end plate 19 and are spaced apart by mixer housing 24 having flanges 25 and are bolted to the end plates by means of bolts 20.

At the intake end of the mixer is a hopper 26 divided into two bins or sections by a partition wall 27 and at the bottom of each hopper are openings 28 and 29 and a slide damper 30 to regulate the flow of the material to be mixed into the mixer chamber where the helical screws 1 and 2 convey the materials along as they are being mixed until it reaches the outlet opening at the other end of the mixer on the underside where there is an outlet opening 31 controlled by a sliding damper 32 to retard the discharge of the mix until the desired mixing has been attained.

While I have shown and described the embodiment of my invention as comprising a helical screw-type mixing machine, it is understood that I do not desire to be limited to the use of two helical screws, as any number can be used and with the use of more than two helical screws the texture of the mixed materials is made finer.

It is to be understood that I do not desire to be limited to any of the details of the mechanism shown or described, except as defined in the appended claims, and the only reason I illustrated a two-helical screw mechanism was because the scientific principle in the use of more than two helical screws is the same and the construction of a two helical screw model was the simplest form to which the scientific principle mentioned can be made applicable.

While in the illustrated mechanism one of the screws is a single thread revolving clockwise at different the speed of the other, which is a double thread helical screw revolving counterclockwise, I do not want to limit my invention to the mechanism illustrated, as both screws can travel clockwise or counterclockwise at the same time, or the gears may be in ratio of two to one, three to one, or four to two, or four to one, etc., as any combination of threads and pitch is possible if the ratio of the intermeshing screws and the overlapping action is maintained—as the substance, fluid, or material proceeds through the chamber, forward or backward.

Let it be further understood, that I do not want to be limited in my invention to two or more helical screws of the same diameter, either inside or outside, simply because of the specification in the illustrated mechanism; as the diameters of the several screws may be different so long as the ratio between pitch and the speed of rotation is maintained.

What I claim is:

1. In a mixing machine, a housing, a pair of parallel shafts journalled therein, a continuous screw on each shaft, said screws being of unequal pitch and meshing with each other, and means for driving said shafts at angular velocities inversely proportional to the pitches of the screws thereon.

2. In a mixing machine, a housing, a pair of parallel shafts journalled theerin, a continuous screw on each shaft, said screws being of unequal pitch and meshing with each other, and means for driving said shafts at angular velocities inversely proportional to the pitches of the screws thereon and in opposite directions.

3. In a mixing machine, a housing, a pair of parallel shafts journalled therein, a continuous screw on each shaft, said screws being of unequal pitch and meshing with each other, the screw of larger pitch having opposed double threads, and means for driving said shafts at angular velocities inversely proportional to the pitches of the screws thereon.

4. In a mixing machine, a housing, a pair of parallel shafts journalled therein, a continuous screw on each shaft, said screws being of unequal pitch and meshing with each other, the screw of larger pitch having opposed double threads, and means for driving said shafts at angular velocities inversely proportional to the pitches of the screws thereon and in opposite directions.

5. In a mixing machine, a housing, a pair of parallel shafts journalled therein, a continuous screw on each shaft, one of said screws having double the pitch of the other, the threads on each shaft meshing with the threads on the other shaft, and means for driving said shafts at angular velocities inversely proportional to the pitches of the screws thereon.

6. In a mixing machine, a housing, a pair of parallel shafts journalled therein, a continuous screw on each shaft, one of said screws having double the pitch of the other, the threads on each shaft meshing with the threads on the other shaft, and means for driving said shafts at angular velocities inversely proportional to the pitches of the screws thereon and oppositely to each other.

7. In a mixing machine, a housing, a pair of parallel shafts journalled therein, a continuous screw on each shaft, one of said screws having double the pitch of the other and having double opposed threads, the threads on each shaft meshing with the threads on the other shaft, and means for driving said shafts at angular velocities inversely proportional to the pitches of the screws thereon.

8. In a mixing machine, a housing, a pair of parallel shafts journalled therein, a continuous screw on each shaft, one of said screws having double the pitch of the other and having double opposed threads, the threads on each shaft meshing with the threads on the other shaft, and means for driving said shafts at angular velocities inversely proportional to the pitches of the screws thereon and oppositely to each other.

ROBERT P. ROWLSON.

REFERENCES CITED

The following references are of record in the file of this patent:

UNITED STATES PATENTS

| Number | Name | Date |
|---|---|---|
| Re. 22,002 | Beken | Jan. 13, 1942 |
| 409,409 | Langer | Aug. 20, 1889 |
| 526,541 | Rippin | Sept. 25, 1894 |
| 1,221,575 | Myers | Apr. 3, 1917 |
| 1,226,108 | Olney | May 15, 1917 |
| 2,306,698 | Heller | Dec. 29, 1942 |